US012160043B2

(12) United States Patent
Caratelli et al.

(10) Patent No.: US 12,160,043 B2
(45) Date of Patent: Dec. 3, 2024

(54) ANTENNA DEVICE WHICH IS SUITABLE FOR WIRELESS COMMUNICATIONS ACCORDING TO A 5G NETWORK STANDARD, RF TRANSCEIVER CONTAINING AN ANTENNA DEVICE, AND METHOD FOR USE IN WIRELESS COMMUNICATIONS ACCORDING TO A 5G NETWORK STANDARD

(71) Applicant: THE ANTENNA COMPANY INTERNATIONAL N.V., Willemstad (CW)

(72) Inventors: Diego Caratelli, Eersel (NL); Ali Naseer Hashim Al-Rawi, Eindhoven (NL)

(73) Assignee: THE ANTENNA COMPANY INTERNATIONAL N.V., Willemstad (CW)

( * ) Notice: Subject to any disclaimer, the term of this patent is extended or adjusted under 35 U.S.C. 154(b) by 195 days.

(21) Appl. No.: 17/763,382

(22) PCT Filed: Aug. 31, 2020

(86) PCT No.: PCT/NL2020/050537
§ 371 (c)(1),
(2) Date: Mar. 24, 2022

(87) PCT Pub. No.: WO2021/060974
PCT Pub. Date: Apr. 1, 2021

(65) Prior Publication Data
US 2022/0359993 A1 Nov. 10, 2022

(30) Foreign Application Priority Data
Sep. 26, 2019 (NL) ..................................... 2023908

(51) Int. Cl.
*H01Q 21/06* (2006.01)
*H01Q 1/24* (2006.01)
*H01Q 9/04* (2006.01)

(52) U.S. Cl.
CPC .......... *H01Q 21/061* (2013.01); *H01Q 1/241* (2013.01); *H01Q 9/0485* (2013.01)

(58) Field of Classification Search
USPC .......................................................... 343/893
See application file for complete search history.

(56) References Cited

U.S. PATENT DOCUMENTS 11,296,417 B2 * 4/2022 Wang ........................ H03H 7/38
2016/0218437 A1 * 7/2016 Guntupalli ........... H01Q 9/0485

(Continued)

OTHER PUBLICATIONS

Search Report and Written Opinion dated Jun. 4, 2020 issued in corresponding Netherland Application No. 2023908.

(Continued)

*Primary Examiner* — Peguy Jean Pierre
(74) *Attorney, Agent, or Firm* — Nath, Goldberg & Meyer; Joshua B. Goldberg

(57) ABSTRACT

Antenna device which is suitable for wireless communications according to a 5G network standard, wherein the antenna device comprises, or consists of:

i) a primary layer having a top side and a bottom side, the primary layer comprising a multitude of adjacent antenna units wherein each antenna unit has a respective electrically conductive antenna plate which is present at the top side of the primary layer, and ii) a dielectric resonator body which comprises, or consists of, a resonator base layer having a top side and a bottom side, which top side is provided with a multitude of adjacent resonator units, wherein the resonator base layer and the resonator units are made of dielectric material, (Continued)

wherein the bottom side of the dielectric resonator body is provided on the top side of the primary layer, and wherein above the antenna plate of each antenna unit a corresponding resonator unit is present.

Method for use in wireless communications according to a 5G network standard, comprising the step of connecting a communication circuit to an antenna device.

20 Claims, 5 Drawing Sheets

(56) References Cited

U.S. PATENT DOCUMENTS

| | | | | |
|---|---|---|---|---|
| 2017/0047660 | A1 * | 2/2017 | Manry, Jr. | H01Q 9/0457 |
| 2017/0125901 | A1 | 5/2017 | Sharawi et al. | |

OTHER PUBLICATIONS

Search Report and Written Opinion dated Nov. 6, 2020 issued in corresponding International Application No. PCT/NL2020/050537.

Al-Rawi, et al., "Scan Properties of Slot-Fed Dielectric Resonator Antenna Arrays for 5G Wireless Communications", 2019 IEEE International Symposium on Antennas and Propagation and USNC-URSI Radio Science Meeting, IEEE, Jul. 7, 2019.

Bahreini, et al., "Optimum Design of a Beam-Forming Array of S-Shaped DRA Elements with a Superstrate on an SIW Feed for 5G Mobile Systems", IEEE Antennas and Wireless Propagation Letters, IEE, Piscataway, NJ, US. vol. 18, No. 7, Jul. 1, 2019.

Sun, et al., "Design of a Circularly Polarized Dielectric Resonator Antenna Array for Millimeter-wave Application", 2019 IEEE MTT-S International Wireless Symposium (IWS), IEEE, May 5, 2019.

Xie, et al., "A study of dielectric resonator antenna array applied to 5G communication system", 2016 Progress in Electromagnetic Research Symposium (PIERS), IEEE, Aug. 8, 2016.

* cited by examiner

ANTENNA DEVICE WHICH IS SUITABLE FOR WIRELESS COMMUNICATIONS ACCORDING TO A 5G NETWORK STANDARD, RF TRANSCEIVER CONTAINING AN ANTENNA DEVICE, AND METHOD FOR USE IN WIRELESS COMMUNICATIONS ACCORDING TO A 5G NETWORK STANDARD

This is a National Phase Application filed under 35 U.S.C. 371 as a national stage of PCT/NL2020/050537, filed Aug. 31, 2020, an application claiming the benefit of Netherlands Application No. 2023908, filed Sep. 26, 2019, the content of each of which is hereby incorporated by reference in its entirety.

Antenna device which is suitable for wireless communications according to a 5G network standard, RF transceiver containing an antenna device, and method for use in wireless communications according to a 5G network standard.

The present invention relates to an antenna device and the application of an antenna device in wireless communications according to a 5G network standard. In particular, the invention is developed for a 5G network standard in which millimeter waves are used.

In the context of antennas which are useful for 5G applications, it is a prerequisite that the antenna has a relatively broad field of view.

Already known in the field are antenna devices based on multiple patch antenna units which are able to achieve a broad field of view, by applying a phase difference over the respective input signals that are led to an array of adjacent patch antenna units. The distance between the central points of the adjacent patch antennas is hereby approximately half the value of the wavelength that is to be emitted.

While such an antenna device achieves a broad field of view, it suffers from emitted signal loss at larger angles. When the emitted signal is measured over a broad field of view and presented in a graph, the main signal that is useful for transmission purposes appears as a 'main lobe' in the graph, whereas another signal which is the result of intrinsic reflective effects of the antenna device appears as a 'side lobe' which signal cannot be used for transmission purposes. This side lobe may in some instances be almost as high as the main lobe, and thus a substantial loss in signal is observed for such antenna devices.

A first objective of the present invention is therefore to develop an antenna device which combines a broad field of view with a relatively low side lobe level, and as such accomplishes a reduction in loss of signal in comparison to the known antenna devices.

Additionally, a further objective of the invention is to develop an antenna device which is operable over a relatively broad frequency range of 24 to 29 GHz.

Another objective of the invention is to develop an antenna device that is capable of adequately exchanging heat with the surrounding air. Especially in 5G applications, an antenna device typically produces a significant amount of heat when in operation, and any overheating of the antenna device should be avoided.

The above objectives are achieved in full or in part by the present invention.

According to a first aspect of the invention, an antenna device is provided which is suitable for wireless communications according to a 5G network standard, wherein the antenna device comprises, or consists of:

i) a primary layer having a top side and a bottom side, the primary layer comprising a multitude of adjacent antenna units wherein each antenna unit has a respective electrically conductive antenna plate which is present at the top side of the primary layer, and ii) a dielectric resonator body which comprises, or consists of, a resonator base layer having a top side and a bottom side, which top side is provided with a multitude of adjacent resonator units, wherein the resonator base layer and the resonator units are made of dielectric material, wherein the bottom side of the dielectric resonator body is provided on the top side of the primary layer, wherein above the antenna plate of each antenna unit a corresponding resonator unit is present.

With regard to the general functioning of such an antenna device, each antenna unit is provided with a corresponding resonator unit for achieving an adequate transmission of electromagnetic signals for its intended use, while in addition thereto the resonator base layer further contributes to the optimization of the transmission from each antenna unit.

Furthermore such a configuration of the primary layer and the dielectric resonator body is also an efficient design for conducting heat that is produced in the primary layer, through the dielectric resonator body towards the surrounding air.

In the antenna device according to the invention, it is preferred that the bottom side of the resonator base layer is directly adhered onto the top side of the primary layer, thereby covering the top side area of the primary layer either completely, or for a major part.

By covering the top side area of the primary layer, the resonator base layer efficiently contributes to the transmission properties of each individual antenna unit, and also efficiently conducts heat that is produced in the primary layer during the operation of the antenna device towards the ambient air that surrounds the upper surface of the resonator body.

The bottom side of resonator base layer and top side of the primary layer are substantially planar, and may be adhered onto each other by an adhesive or tape. Alternatively the resonator base layer and the primary layer may be formed out of one piece, by a co-firing technique for ceramic material such as used for producing low temperature co-fired ceramics (LTCC).

In particular it is preferred in the antenna device according to the invention, that the dielectric resonator body is made as a single piece, and is preferably made from a single dielectric material.

In the dielectric resonator body made as a single piece, the resonator base layer and the resonator units together form a continuous body of material. Any discontinuities in design or material of the resonator body are thus avoided, which is advantageous because the presence of discontinuities is known to negatively affect the electromagnetic wave conversion process supported by the combination of the resonator base layer and the resonator units. For the same reasons, it is preferred that the resonator body is made from a single dielectric material.

Effectively, the dielectric properties of the dielectric resonator body according to the invention are virtually isotropic over its whole volume.

In this context, it is further preferred that the resonator body is massive, i.e. devoid of cavities.

Furthermore, it is advantageous when the same dielectric resonator body is made as a single piece and from a single dielectric material, because it allows for an expedient manner of production, such as injection-moulding in one step.

It is generally preferred that in the antenna device according to the invention, the resonator units are substantially identical, and the antenna units are substantially identical.

It is further preferred in the antenna device according to the invention, that the dielectric resonator body has a relative permittivity in the range of 5-20, preferably in the range of 8-14, more preferably 10.

Such values of relative permittivity have proven most suitable for the intended use. Suitable dielectric materials that may be used for making the dielectric resonator body include low-loss dielectric materials based on glass, ceramics, or polymers.

In this context it is especially preferred that the dielectric resonator body is substantially made from alumina.

It has been found that alumina is an attractive material for the resonator body in terms of its resonating properties (alumina has a relative permittivity of 10), as well as in terms of its heat conducting properties.

An attractive embodiment of the antenna device according to the invention, relates to the antenna device being devoid of an integrated waveguide, in particular the primary layer and the resonator body being devoid of an integrated waveguide.

Such an embodiment allows to design the antenna device in a more compact way, because no space for a waveguide is needed in either the primary layer or resonator body. Furthermore, the production of the antenna device is less costly and less time consuming.

Even when no integrated waveguide is included in the antenna device according to the invention, it has been found that an attractive transmission of electromagnetic signals for its intended use is still achievable by the invention.

It is preferred in the antenna device according to the invention, that the resonator units are spaced apart from each other, and each resonator unit has the form of an individual stud projecting from the resonator base layer.

Such a configuration of the resonator units has proven to be highly suitable for the antenna device in order to achieve the intended advantages of the invention.

It is furthermore preferred in the antenna device according to the invention, that each resonator unit has a height that is equal to or greater than its maximum width.

Such a dimensional design of the resonator unit may be referred to stud projecting from the resonator base layer, or as a pillar.

In particular it is attractive in the antenna device according to the invention, that each resonator unit, viewed in a cross-section perpendicular to its axis of height, has a cross-sectional contour of a radial shape, such as a star-shape, or a cross-shape.

Such a shape has attractive properties both in regard of transmission of signals, as in regard of exchanging heat with surrounding air.

Alternatively, the resonator unit may be designed such that it has a cross-sectional contour of a rectangle, an ellipse or an oval, or combinations thereof.

The cross-sectional contour of the resonator unit may further be defined by the polar function:

$$\rho_d(\varphi) = \left( \left| \frac{1}{a} \cos \frac{m_1}{4} \varphi \right|^{n_2} + / - \left| \frac{1}{b} \sin \frac{m_2}{4} \varphi \right|^{n_3} \right)^{\frac{1}{n_1}}$$

wherein:

$\rho_d(\varphi)$ is a curve located in the XY-plane, $\varphi \in [0, 2\pi)$ is the angular coordinate, m1≠0 and m2≠0, and wherein at least one of n1, n2, and n3 does not equal 2, and preferably none of n1, n2, and n3 equals 2.

It is especially preferred that the cross-sectional contour of each resonator unit is substantially of the same form along its axis of height, and preferably of the same size along its axis of height.

A preferred feature of the antenna device according to the invention, is that each resonator unit has an axis of symmetry that is substantially perpendicular to the respective antenna plate above which it is present.

Such a resonator unit has an optimum orientation with regard to the respective antenna plate, in regard of influencing the signal emitted from the antenna plate.

It is even more preferred in this context, that the axis of symmetry of the resonator unit coincides with a central part of the respective antenna plate onto which it is attached.

In the antenna device according to the invention, it is preferred that the height of each resonator unit is in the range of 3 to 6 mm, and the maximum width is in the range between 2.5 and 4.5 mm.

Typically, the height of a resonator unit is between 3.5 and 4.5 mm.

Furthermore, it is preferred in the antenna device according to the invention, that the thickness of the resonator base layer is lower than 1.00 mm, preferably in the range of 0.25 to 0.85 mm.

It is particularly preferred in the antenna device according to the invention, that the thickness of the resonator base layer is a fraction of the height of each resonator unit, preferably a fraction between 30% and 10%.

According to a preferred embodiment of the antenna device according to the invention, any pair of directly adjacent antenna units within the primary layer are spaced apart from another by a distance of 4 to 6 mm, preferably 5.1-5.5 mm, said distance being measured in the plane of the primary layer and between the central points of the respective antenna units.

Such a distance between the antenna units is particularly suitable when the antenna device is applied in a frequency range of 24 to 29 GHz.

Analogously, it is preferred that in the antenna device according to invention any pair of directly adjacent resonator units are spaced apart from another by a distance of 4 to 6 mm, preferably 5.1-5.5 mm, measured parallel to the plane of the primary layer and between the central points of the respective resonator units.

It is advantageous when in the antenna device according to the invention, the multitude of adjacent antenna units is provided in parallel arrays, thus forming a grid pattern, which results in a larger effective area of the antenna device and, therefore, enhanced peak gain characteristics. The grid pattern is for instance made up of a number of rows of antenna units that are aligned parallel to each other.

Such a formation of the antenna units is highly suitable for the intended application of the antenna device in 5G communication systems and networks.

Typically, all the parallel rows of the grid pattern contain the same number n of antenna units. Furthermore, the number m of parallel rows in the grid structure may be the same as the number n of antenna units in a single row, so that a grid pattern of n×m cells, that is the square of n, is formed.

Analogously, it is preferred that in the antenna device according to the invention, the multitude of adjacent resonator units are provided in parallel arrays, thus forming a grid pattern.

It is preferred in the antenna device according to the invention, that the antenna comprises a number of 36 to 100 antenna units and an identical number of respective resonator units, preferably in the range of 49 to 81, such as 64.

Such a number of antenna units is suitable for the intended applications of the antenna device.

A further preferred feature of the antenna device according to the invention, is that the antenna plate of each antenna unit is provided with an aperture or slot, preferably at the central position of the antenna plate. Said slot is used to feed the dielectric resonator structure of the relevant antenna unit.

The use of an antenna slot feed was found to be effective in improving the overall circuital characteristics, such as impedance matching bandwidth, and radiation properties, such as gain, of the individual dielectric resonator antenna elements, as well as the antenna device as a whole.

Preferably, the antenna plate consists of a rectangular shaped electrically conductive plate in which the individual feeding slot is realized, for instance at the central position of each antenna plate. The antenna feeding slots are typically created in the conductive plate by etching.

The shape of the slot may for instance be rectangular, circular, or elliptical, or have a cross- or star-like profile. Furthermore, the shape of the slot may be defined by the polar function:

$$\rho_d(\varphi) = \left( \left| \frac{1}{a} \cos \frac{m_1}{4} \varphi \right|^{n_2} + / - \left| \frac{1}{b} \sin \frac{m_2}{4} \varphi \right|^{n_3} \right)^{\frac{1}{n_1}}$$

wherein:

$\rho_d(\varphi)$ is a curve located in the XY-plane, $\varphi \in [0, 2\pi)$ is the angular coordinate, $m1 \neq 0$ and $m2 \neq 0$, and wherein at least one of n1, n2, and n3 does not equal 2, and preferably none of n1, n2, and n3 equals 2.

With respect to the antenna units in the antenna device according to invention, each antenna unit preferably features:

- a respective feed connector for an electrical input signal, which feed connector is present at the bottom side of the primary layer and is connected by electrically conductive vias to the respective antenna plate, and
- a respective electrically conductive strip line which is present inside the primary layer and which is electrically isolated from the antenna plate and the conductive vias by a respective dielectric laminate material.

It is furthermore preferred when a distributed impedance matching network is integrated in the primary layer for optimizing the input signal that is led to the antenna plate.

The isolated strip line functions as a ground for the antenna unit.

Typically, the thickness of metal layers present in the primary layer is 25 micrometers.

It is advantageous when in the antenna device according to the invention, the primary layer is a printed circuit board which is composed from layers of a dielectric substrate onto which electrically conductive structures are printed.

As such, the printed circuit board allows to integrate the multiple antenna units into one layered structure, which forms the primary layer, and such a structure can be manufactured at relatively low cost.

The antenna device according to the invention is advantageously configured to operate in a frequency range of 24 to 29 GHz. Such a relatively broad range of frequency further enhances the suitability of the antenna device for 5G applications.

According to a second aspect, the invention also relates to a RF transceiver of a wireless communications device comprising at least one antenna device according to the first aspect of the invention.

A further special embodiment of the invention relates to an electronic device comprising an RF transceiver according to the above definition.

In a third aspect, the invention relates to a method for use in wireless communications according to a 5G network standard, comprising the step of connecting a communication circuit to an antenna device according to the first aspect of the invention.

EXAMPLE

An example of a preferred embodiment of the antenna device according to the invention is presented with reference to the attached figures, wherein.

Figure 1:
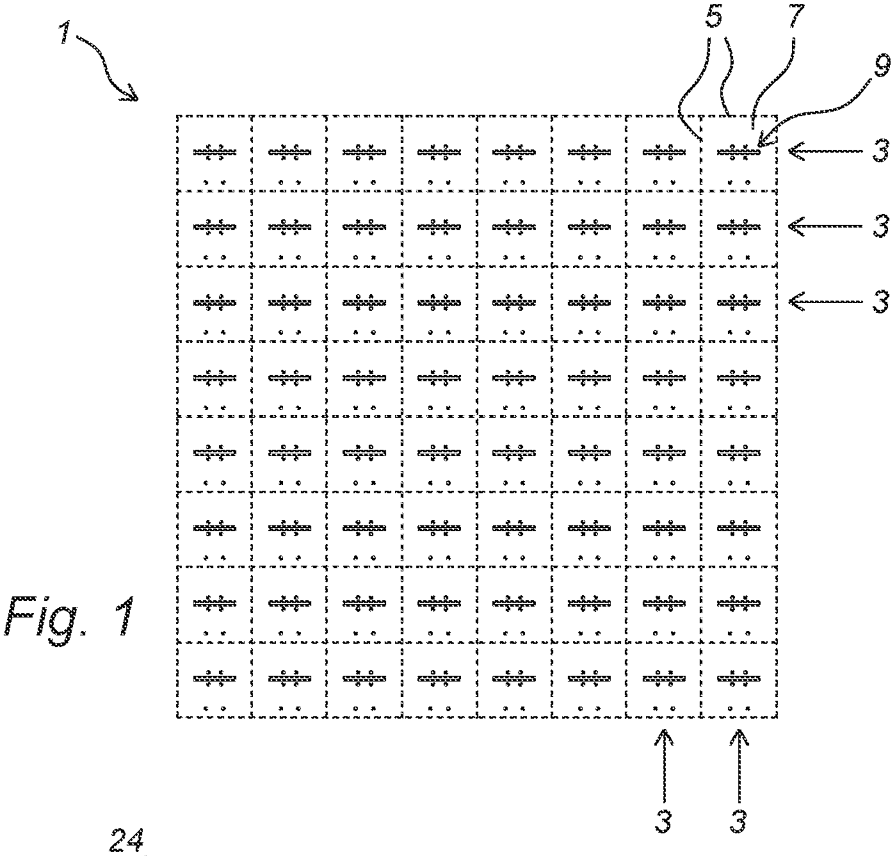
FIG. 1 shows a top view of a primary layer.

FIG. 1 shows a top side of a primary layer 1 which contains 64 adjacent antenna units 3 which are positioned in a grid of 8 parallel rows of 8 antenna units. The top layer of each antenna unit 3 is composed of an outer boundary 5 that surrounds an electrically conductive antenna plate 7 which is provided with a longitudinal slot 9.

Figure 2:
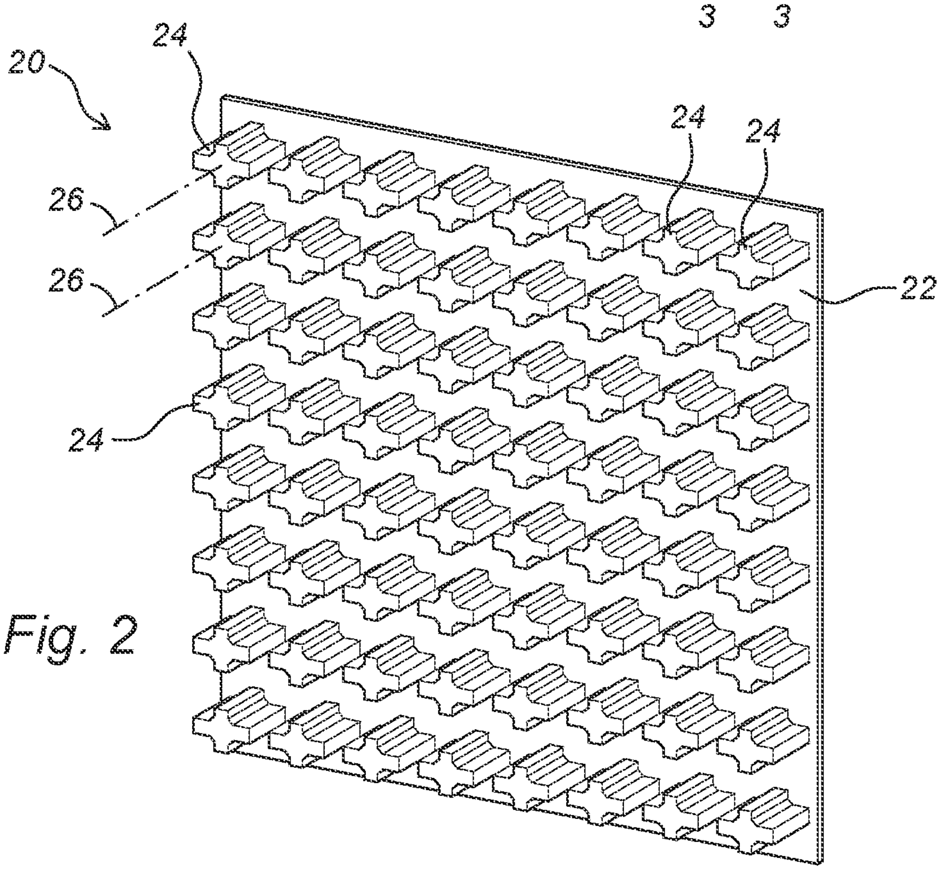
FIG. 2 shows a perspective view of a dielectric resonator layer.

FIG. 2 shows a top side of a dielectric resonator body 20, composed of a dielectric resonator base layer 22 provided with adjacent dielectric resonator units 24 that protrude as studs from the base layer 22 along a central axis of height 26 of each resonator unit. The shape of the resonator unit 24 when seen in a cross-section perpendicular to the axis of height, also referred to as the cross-sectional contour of the resonator unit, has the shape of a cross. With respect to the cross-sectional contour of the resonator unit being a cross, the central axis of height 26 is also an axis of symmetry for this cross shape.

The resonator base layer 22 is congruent with the primary layer 1 of FIG. 1, both in respect of the length and width, as well as the grid structure.

In order to obtain the antenna device according to the invention, the resonator body 20 is adhered on the top side of the primary layer 1 in a fully covering way, wherein the position of the axis 26 of each resonator unit coincides with the central point of a corresponding antenna unit 3 that is present underneath the resonator unit. Consequently, above the antenna plate of each antenna unit 3, a corresponding resonator unit 24 is present.

Figure 3:
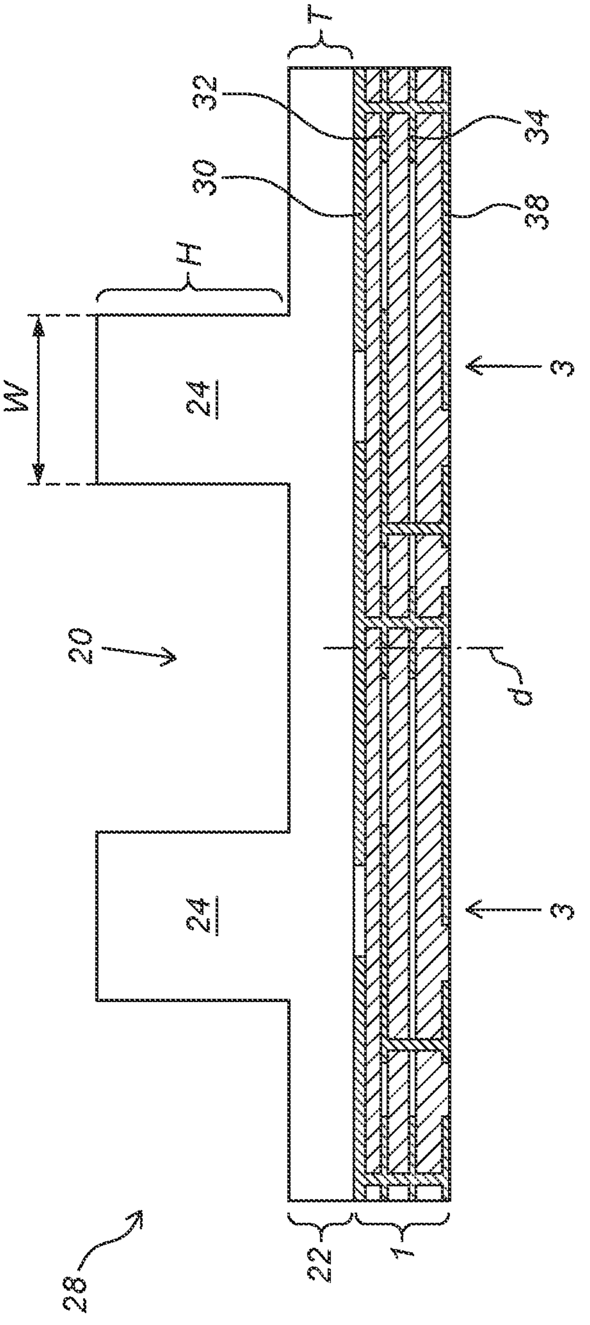
FIG. 3 shows a cross-section of a part of the antenna device which is composed by the assembly of the primary layer and the resonator layer.

FIG. 3 shows a cross-section of a part of an antenna device 28, which is constructed by adhering the bottom side of the dielectric resonator body 20 of FIG. 2 onto the top side of the primary layer 1 of FIG. 1.

The primary layer 1 is a printed circuit board which is composed from layers of a dielectric substrate onto which electrically conductive structures are printed. Two adjacent and identical antenna units 3 are shown which are connected to each other at the dotted line d.

Each antenna unit 3 contains:

a top layer 30 that is constructed as depicted in FIG. 1, i.e. having an outer boundary 5 that surrounds an electrically conductive antenna plate 7 which is provided with a longitudinal rectangular slot 9.

A bottom layer 38 containing a feed connector for an electrical input signal, which feed connector is connected by electrically conductive vias to the respective antenna plate 7 in top layer 30.

An intermediate layer 32 containing a distributed impedance matching network printed on a dielectric layer through which the conductive vias are led.

A further intermediate layer 34 containing an electrically conductive strip line or around plate which is electrically isolated from the antenna plate and the conductive vias by a dielectric layer, The resonator base layer 22 has a thickness T of 0.55 mm, the resonator units 22 have a height H of about 4 mm and a maximum width W of about 3 mm.

Figure 4:
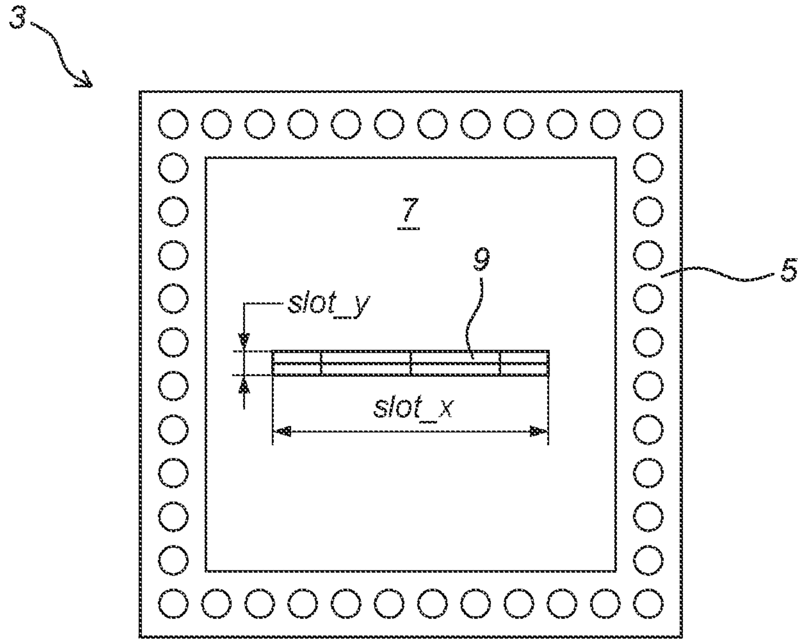
FIG. 4 shows a top view of single antenna unit that is part of the primary layer.

FIG. 4 shows a top side of a single antenna unit 3, which has an outer boundary 5 that surrounds an electrically conductive antenna plate 7 which is provided with a longitudinal slot 9.

Figure 5:
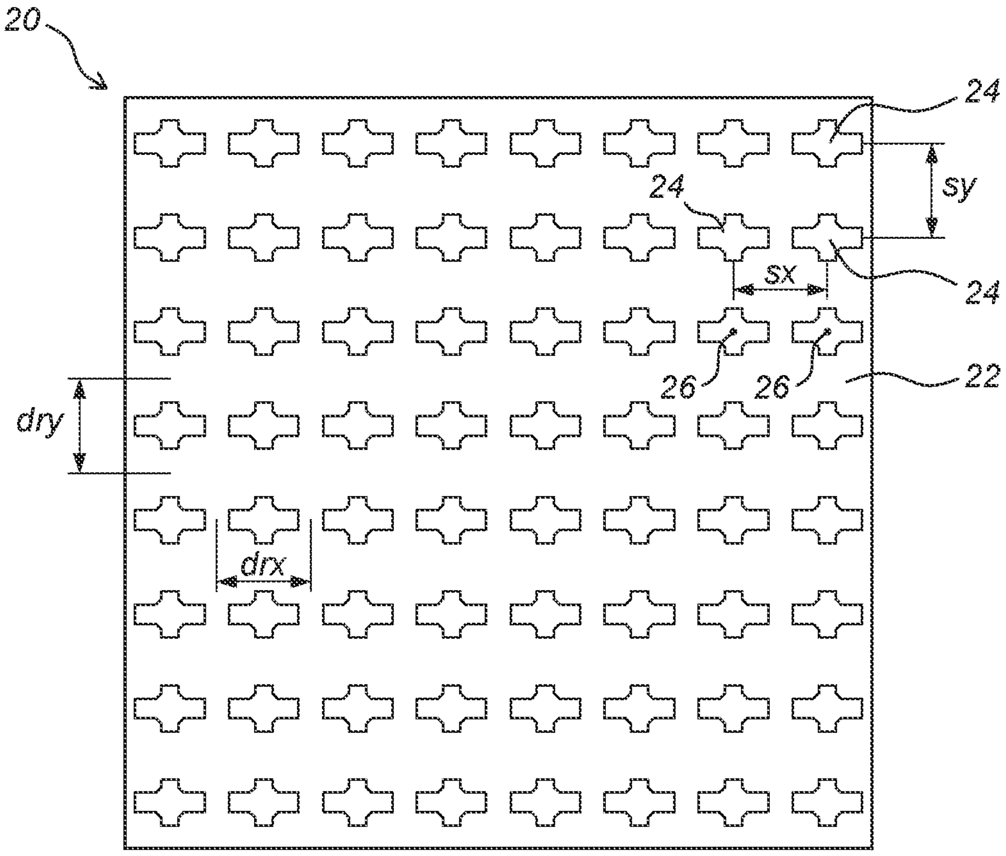
FIG. 5 shows a top view of a dielectric resonator layer.

FIG. 5 shows a top view of the dielectric resonator body 20 of FIG. 2, having cross-shaped resonator units 24 protruding from the resonator base layer 22. The resonator units 24 have two different widths: a width drx of 3 mm in a first direction x, and a width dry of 2 mm in a second direction y. The distance sx and sy between the central axis 26 of adjacent resonator units 24 is about 5.3 mm.

Results

The performance of the antenna device according to the above preferred embodiment of the invention (indicated herein as 'DRA'), has been compared with the performance of a comparative antenna device (indicated herein as 'Patch') which has an identical primary layer as the invention but which is not provided with a dielectric resonator layer as the invention.

Figure 6:
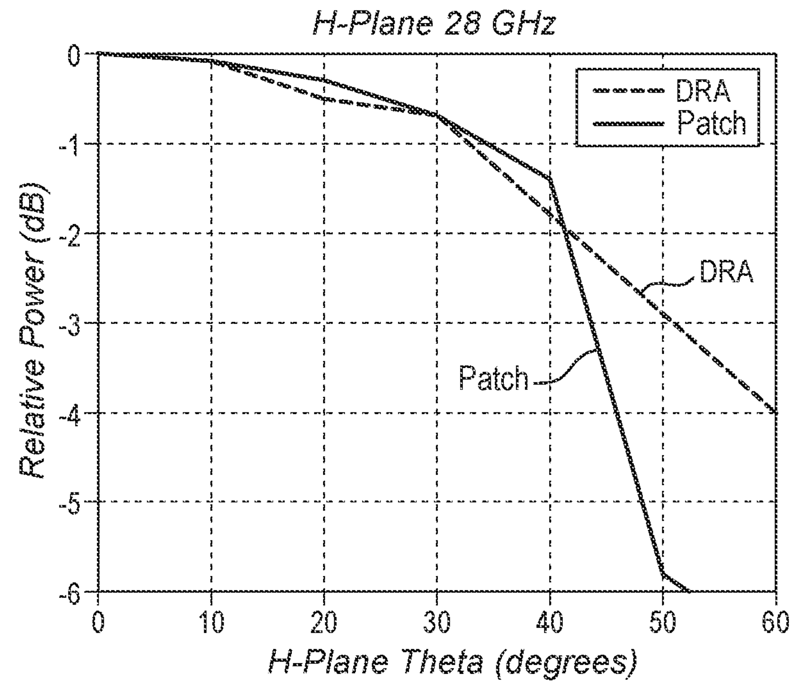
Figure 7:
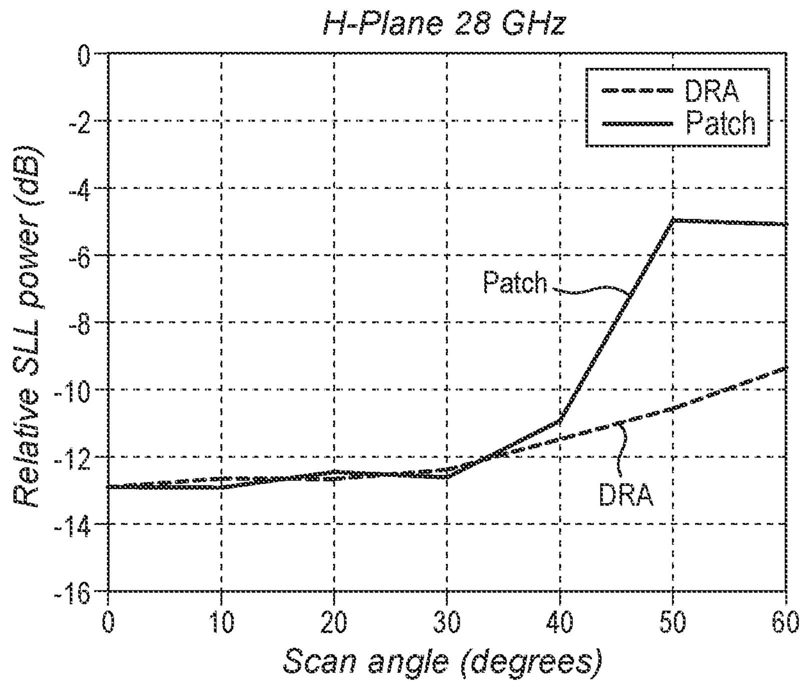
Figure 8:
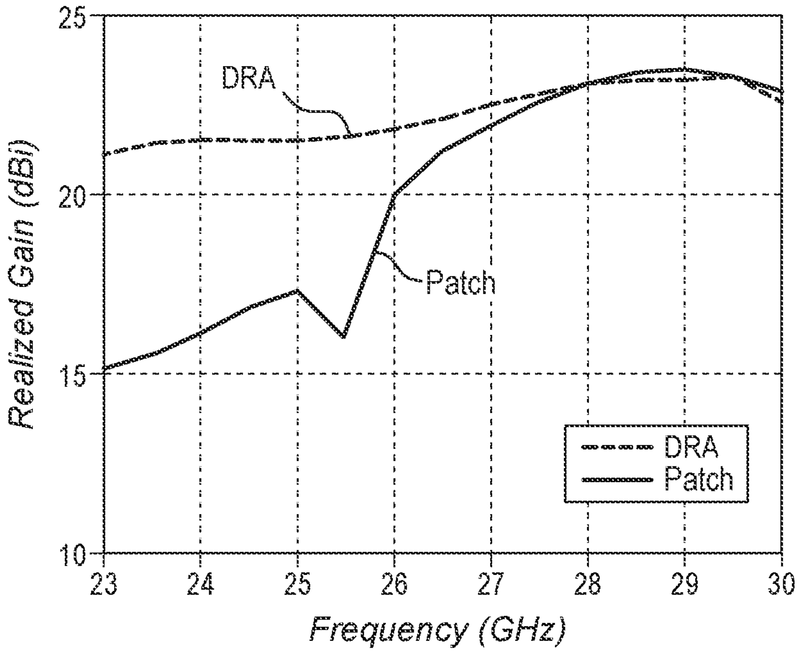

Reference is made to the attached figures, wherein:

FIG. 6 shows a graph of the relative power of an emitted signal over a field of view from 0 to 60 degrees;

FIG. 7 shows a graph of the relative power for a side lobe of an emitted signal over a field of view from 0 to 60 degrees;

FIG. 8 shows a graph of the overall realized gain over a frequency from 23 to 30 GHz.

In FIG. 6, it is shown that the relative power measured for the 'Patch' device drops off dramatically from 40 degrees onward, whereas the relative power measured for the 'DRA' device drops off far less and more gradually.

In FIG. 7, it is shown that the relative power relevant to side lobes measured for the 'Patch' device increases significantly for scanning angles larger than 40 degrees, whereas the relative power associated with side lobes measured for the 'DRA' device increases less, and only slightly.

In FIG. 8, it is shown that the 'DRA' device according to the invention achieves a rather flat gain over the whole frequency range of 23 to 30 GHz, whereas the gain for the 'Patch' device is seriously compromised in the frequency range from 23 to 27 GHz.

In summary, it is proven by the above results that the antenna device according to the invention features a nearly flat gain over the whole frequency range from 23 to 30 GHz, while displaying a relatively low loss of the radiated power over a broad field of view, especially at large angles above 40 degrees.

The invention claimed is:

1. Antenna device which is suitable for wireless communications according to a 5G network standard, wherein the antenna device comprises, or consists of:

i) a primary layer having a top side and a bottom side, the primary layer comprising a multitude of adjacent antenna units wherein each antenna unit has a respective electrically conductive antenna plate which is present at the top side of the primary layer, and ii) a dielectric resonator body which comprises, or consists of, a resonator base layer having a top side and a bottom side, which top side is provided with a multitude of adjacent resonator units, wherein the resonator base layer and the resonator units are made of dielectric material, wherein the bottom side of the dielectric resonator body is provided on the top side of the primary layer, and wherein above the antenna plate of each antenna unit a corresponding resonator unit is present, wherein the bottom side of the resonator base layer is directly adhered onto the top side of the primary layer, thereby covering the top side area of the primary layer either completely, or for a major part, and wherein the antenna plate of each antenna unit is provided with an aperture or slot, preferably at a central position in the antenna plate.

2. Antenna device according to claim 1, wherein the dielectric resonator body is made as a single piece, and is preferably made from a single dielectric material.

3. Antenna device according to claim 1, wherein the dielectric resonator body has a relative permittivity in the range of 5-20, preferably in the range of 8-14, more preferably 10.

4. Antenna device according to claim 3, wherein the dielectric resonator body is substantially made from alumina.

5. Antenna device according to claim 1, wherein the antenna device is devoid of an integrated waveguide, in particular the primary layer and the resonator body are devoid of an integrated waveguide.

6. Antenna device according to claim 1, wherein the resonator units are spaced apart from each other, and each resonator unit has the form of an individual stud projecting from the resonator base layer.

7. Antenna device according to claim 1, wherein each resonator unit has a height that is equal to or greater than its maximum width.

8. Antenna device according to claim 1, wherein each resonator unit, viewed in a cross-section perpendicular to its axis of height, has a cross-sectional contour of a radial shape, such as a star-shape, or a cross-shape.

9. Antenna device according to claim 8, wherein the cross-sectional contour of each resonator unit is substantially of the same form along its axis of height, and preferably of the same size along its axis of height.

10. Antenna device according to claim 1, wherein each resonator unit has an axis of symmetry that is substantially perpendicular to the respective antenna plate above which it is present.

11. Antenna device according to claim 1, wherein the height of each resonator unit is in the range of 3 to 6 mm, preferably in the range of 3.5 to 4.5 mm, and the maximum width is in the range between 2.5 and 4.5 mm.

12. Antenna device according to claim 1, wherein the thickness of the resonator base layer is lower than 1.00 mm, preferably in the range of 0.25 to 0.85 mm.

13. Antenna device according to claim 1, wherein any pair of directly adjacent antenna units within the primary layer are spaced apart from another by a distance of 4 to 6 mm, preferably 5.1-5.5 mm, said distance being measured in the plane of the primary layer and between the central points of the respective antenna plates, and/or any pair of directly adjacent resonator units within the resonator body are spaced apart from another by a distance of 4 to 6 mm, preferably 5.1-5.5 mm, measured parallel to the plane of the primary layer and between the central points of the respective resonator units.

14. Antenna device according to claim 1, wherein the multitude of adjacent resonator units are provided in parallel arrays, thus forming a grid pattern, and/or wherein the multitude of adjacent antenna units are provided in parallel arrays, thus forming a grid pattern.

15. Antenna device according to claim 1, wherein the antenna comprises a number of 36 to 100 antenna units and an identical number of corresponding resonator units, preferably the number is in the range of 49 to 81, such as 64.

16. Antenna device according to claim 1, wherein each antenna unit has a respective feed connector for an electrical input signal, which feed connector is present at the bottom side of the primary layer and is connected by electrically conductive vias to the respective antenna plate, and a respective electrically conductive strip line which is present inside the primary layer and which is electrically isolated from the antenna plate and the conductive vias by a respective dielectric spacer structure.

17. Antenna device according to claim 1, wherein the primary layer is a printed circuit board which is composed from layers of a dielectric substrate onto which electrically conductive structures are printed.

18. Antenna device according to claim 1, wherein the antenna device is configured to operate in a frequency range of 24 to 29 GHz.

19. RF transceiver of a wireless communications device comprising at least one antenna device according to claim 1.

20. Method for use in wireless communications according to a 5G network standard, comprising the step of connecting a communication circuit to an antenna device according to claim 1.

* * * * *